(No Model.) 2 Sheets—Sheet 1.

G. G. SMITH.
LOCK.

No. 386,501. Patented July 24, 1888.

Attest:
A. N. Jesbera
M. E. Finley

Inventor:
George G. Smith.
By David A. Burr.
Atty.

(No Model.) 2 Sheets—Sheet 2.

G. G. SMITH.
LOCK.

No. 386,501. Patented July 24, 1888.

Attest:
A. N. Jeshiva.
M. C. Finley.

Inventor:
George G. Smith,
By David A. Burr,
Atty.

N. PETERS, Photo-Lithographer, Washington, D. C.

UNITED STATES PATENT OFFICE.

GEORGE G. SMITH, OF ST. ALBANS, VERMONT.

LOCK.

SPECIFICATION forming part of Letters Patent No. 386,501, dated July 24, 1888.

Application filed September 22, 1887. Renewed June 26, 1888. Serial No. 278,291. (No model.)

*To all whom it may concern:*

Be it known that I, GEORGE G. SMITH, of St. Albans, in the county of Franklin and State of Vermont, have invented a new and useful Improvement in Locks; and I do hereby declare that the following is a full and exact description thereof, reference being had to the accompanying drawings, and to the letters of reference marked thereon, making a part of this specification, in which—

Figure 1:
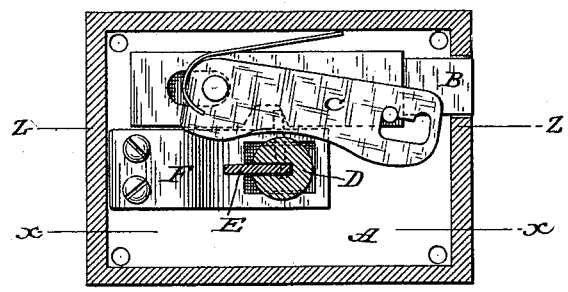
Figure 2:
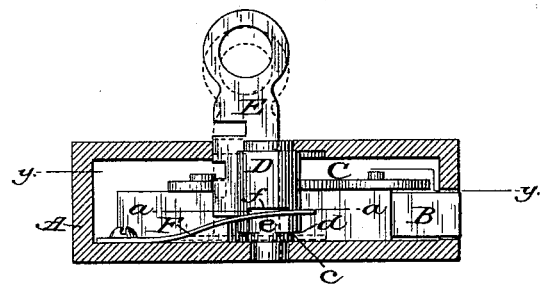
Figure 3:
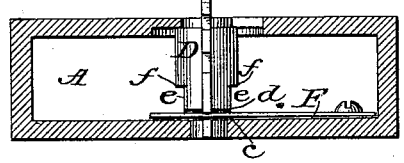
Figure 4:
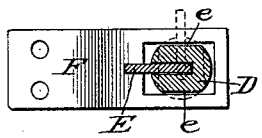
Figure 5:
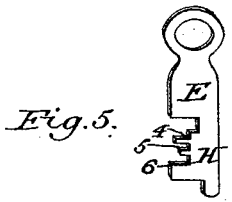
Figure 11:
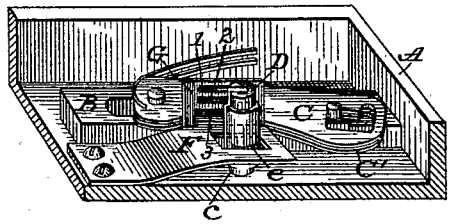
Figure 11:
Figure 12:
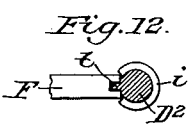
Figure 13:
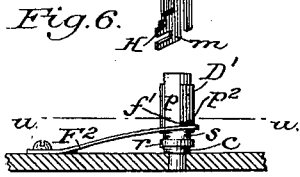
Figure 13:
Figure 7:
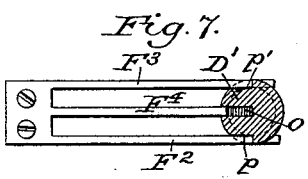
Figure 9:
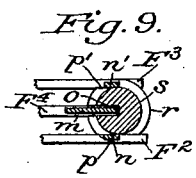
Figure 10:
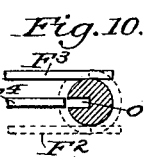
Figure 8:
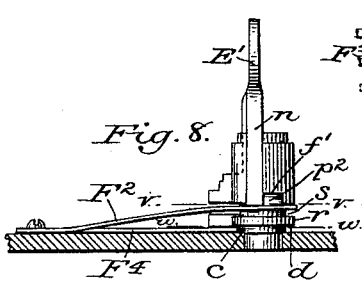

Figure 1 is a longitudinal section of a lock containing my invention, taken in the line $y\,y$ of Fig. 2. Fig. 2 is a section of the same in line $x\,x$ of Fig. 1. Fig. 3 is a similar section in line $z\,z$ of Fig. 1, with the key partly turned, as indicated by dotted lines in Fig. 1. Fig. 4 is a detached sectional view in detail of the key, key-barrel, and spring in line $a\,a$ of Fig. 2. Fig. 5 is a view in perspective of a lock illustrating a modification of the invention. Figs. 6 to 10 are sectional details illustrating another modification, Fig. 7 being a section, on an enlarged scale, in the line $u\,u$ of Fig. 6; Fig. 8, a side elevation, also upon an enlarged scale, of the key-barrel with the key fitted therein; and Fig. 9 a cross-section in line $v\,v$, and Fig. 10 a cross-section in line $w\,w$, of Fig. 8. Figs. 11 to 13 are detached views illustrating still another modification, Fig. 12 being a cross-section in line $b\,b$, and Fig. 13 a similar cross-section, showing the key-barrel partly turned.

Similar letters indicate like parts in all the figures.

My invention relates to that class of locks in which the key operates directly upon the bolt to actuate it, and is guided and supported by a barrel mounted in the lock-case to turn with the key; and it has for its object to provide in a simple manner for the confinement of the rotating barrel until it is released by the key and to increase thereby the efficiency and security of the lock.

It consists in the combination, with the rotating key-barrel, of a flat locking-spring whose free end is adapted to move in a plane parallel with the axis of the barrel in position to be struck by the inner end of the key when it is inserted in the barrel and to be carried with it out of engagement with the barrel, so as to permit the key to be turned to operate the lock.

It consists, furthermore, in various details in the construction and combination of the several parts, as hereinafter fully described.

In the accompanying drawings, A represents the case, B the bolt, and C one of the tumblers of a tumbler-lock of simple form.

Within the case A a key-barrel, D, is mounted in the usual manner to rotate in suitable bearings formed to receive its two ends in the opposite faces of the case. This barrel is preferably longitudinally slitted in the customary manner with a radial groove or keyway to receive a flat key, E, adapted to engage and move the lock-bolt.

An annular groove, $c$, is formed about the inner or lower end of the barrel D, inside of the case, whereby a shoulder, $d$, is produced, and flat faces $e\,e$ (see Figs. 2, 3, and 4) are cut out longitudinally on opposite sides of the barrel, parallel with each other, to a depth equal to that of the groove $c$, thereby producing a second shoulder, $f$, on each side of the barrel, as shown in Figs. 2 and 3. A flat spring-plate, F, slotted at one end to embrace the portion of the barrel included between the faces $e\,e$ and to play into the groove $c$, is secured at its opposite end to the inner face of the case, so that said free slotted end, embracing the barrel, shall, by its resiliency, bear automatically against the shoulders $d$ or $f\,f$ of the barrel. When the flat faces $e\,e$ of the barrel are embraced by the spring, the barrel is thereby prevented from turning; but when the spring is forced down or inward, so as to carry it into register with the cylindrical recess $c$ and below the shoulder $d$, the barrel will, by reason of said recess, be left free to turn. The spring is thus forced down or inward by means of the key E when the key is inserted in the keyway of the barrel and pressed inward to bring it into position to turn and lift the tumbler C and throw the bolt B of the lock. In brief, the free end of the plate F, by springing automatically upward or inward, so engages the barrel D as to prevent it from turning; but by fitting the key E in the barrel and pressing it inward the spring-plate is thereby disengaged from the barrel, leaving it free to turn with the key.

It is evident that instead of forming two flat faces, $e\,e$, on opposite sides of the barrel D, to be engaged by the spring F, one will suffice to prevent a movement of the barrel, and, also, that the end of the plate F may be made to spring up into a notch or recess cut in the barrel to prevent the barrel from turning, (see Fig. 7,) provided said end be in position to be carried out of the notch by the key when the latter is pressed inward into proper position to work the lock.

In the modification of my invention illustrated in Fig. 5 additional security is provided in the lock by combining with the spring plate F, adapted to engage the barrel D and prevent its turning, in manner as described, a lateral plate, G, having one or more slots, 1 2 3, cut therein to correspond accurately with the divisions 4 5 6 of the bit H of the key E, so that when a key having these divisions is pressed down upon the spring the slots 1 2 3 will permit the divisions 4 5 6 to pass through them to engage and operate, in the customary manner, the appropriate tumblers C C' and bolt B of the lock. The spring F will operate in this case to prevent an engagement of the key with the tumblers and bolt until the spring has been forced down far enough to release the barrel D and permit the key to turn. The tumblers C C' will thus be guarded by the spring F, so that they may not be lifted unless the spring be forced down or inward, and so held while the tumblers are being moved.

In the modification illustrated in Figs. 6 to 10 the barrel D' is engaged by a series of springs, which are severally depressed by longitudinal divisions of the key, each from a position of engagement with the barrel to a position in which the barrel is left free to rotate independently thereof.

Figure 6:
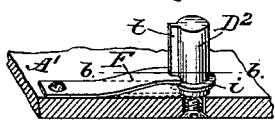
Figure 6:
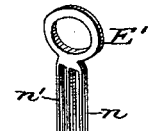

E', Fig. 6, represents the key formed with a central longitudinal plate, $m$, carrying the customary bit, H, and with parallel lateral plates $n$ $n'$. The barrel D' is formed with a central longitudinal radial groove or keyway, $o$, Fig. 7, therein, to receive the central key-plate, $m$, and with parallel longitudinal recesses $p$ $p'$, cut out on either side thereof, to receive the lateral key-plates $n$ $n'$.

An annular projection, $r$, (see Figs. 6 and 8,) is formed about the periphery of the barrel, a short distance above its inner or lower end, by cutting out two circumferential grooves, $c$ and $s$, in the barrel.

The longitudinal recesses $p$ $p'$ are enlarged laterally a short distance above the circumferential groove $s$, as at $p^2$, (see Fig. 8,) and offsets $f'$ $f'$ are formed thereby to stop the upward play of the side springs engaging the barrel. The side springs, $F^2$ $F^3$, together with a central parallel spring, $F^4$, are secured at one end to the case-plate, so as to project toward the key-barrel D'. The free ends of the side springs bear upwardly against the offsets $f'$ $f'$ and laterally against the flat faces of the recesses $p$ $p'$ therein, above the circumferential groove $s$, so as to prevent the barrel from turning. The central spring, $F^4$, enters the central groove or keyway, $o$, and by its engagement therewith performs a similar function.

The central spring, $F^4$, is of such a length as that when depressed it will register with the circumferential groove $c$, and the lateral springs $F^2$ $F^3$ may be depressed to register with either of the circumferential recesses $c$ or $s$. When all three of the springs are thus depressed, each to register with one of said grooves, the barrel is left free to rotate with the key. While the central key-plate, $m$, will carry the central spring, $F^4$, to the annular groove $c$, the lateral key-plate $n'$ may be made of the same length, so as to carry the spring $F^3$ to the same groove $c$, the key-plate $n$ being of a length to carry the spring $F^2$ to the groove $s$.

It is evident that a key adapted to this particular relative arrangement and adjustment of the several springs and grooves is required to permit a rotation of the key-barrel, and that by varying the lengths of the respective key-plates and the position of the annular grooves in the barrel a very large number of changes can be readily made in the locks.

In the modification of my invention illustrated in Figs. 11 to 13 the barrel $D^2$ is represented as fitted to rotate upon the plate A' of the case at a right angle thereto upon a single bearing, its outer or upper end being left free to enter the tubular stem of the key $E^2$. This barrel is formed with a longitudinal rib, $t$, projecting radially therefrom, and the key is longitudinally slotted to pass over said rib.

The spring-plate F is notched at its free end to embrace said rib $t$, and is so adjusted with reference thereto as that when free it will embrace and engage the same, (see Figs. 11 and 12,) and thereby prevent the barrel from turning.

Below the end of this rib $t$, and near to the inner face of the case-plate A', to which the barrel is pivoted, an annular flange or collar, $i$, is formed; but the portion thereof under the end of the rib is cut away, (see Figs. 12 and 13,) to permit the end of the spring F playing on said rib to be depressed by the key below the flange, so that when the spring is thus depressed to clear the rib and the barrel is turned the spring will be caught and held under the flange, as shown in Fig. 13.

I claim as my invention—

1. The combination, in a lock, with a suitable external case, A, a key-barrel, D, fitted to rotate therein, and whose inner end is formed with a flat surface or surfaces parallel with its axis, a key adapted to be supported and guided by said barrel, and a bolt, B, to be actuated by said key, of a flat spring secured to the case, and whose free end, moving in a plane parallel with the axis of said barrel, springs into contact with the flat surface of the barrel to stop the rotation thereof, and in position to be struck and depressed by the inner end of the key when in readiness to be turned to actuate the bolt, substantially in the manner and for the purpose herein set forth.

2. The combination, in a lock, of a bolt, a key for actuating the same, a rotating key-barrel to engage the key and turn with it and formed with an encircling groove or recess, a spring-plate whose free end engages the barrel to stop it, and is adapted to be carried by the key into register with the encircling groove of the barrel to permit its rotation, and a lateral slotted guard-plate attached to the spring-plate and interposed between the barrel and the bolt, substantially in the manner and for the purpose herein set forth.

In testimony whereof I have signed my name to this specification in the presence of two subscribing witnesses.

GEO. G. SMITH.

Witnesses:
A. N. JESBERA,
D. A. BURR.